United States Patent [19]

Emerson et al.

[11] Patent Number: 4,565,836

[45] Date of Patent: Jan. 21, 1986

[54] MULTI-MODAL EMULSIONS OF WATER-SOLUBLE POLYMERS

[75] Inventors: Richard R. Emerson; Do I. Lee, both of Midland; James P. Easterly, Bay City, all of Mich.

[73] Assignee: The Dow Chemical Company, Midland, Mich.

[21] Appl. No.: 498,222

[22] Filed: May 26, 1983

[51] Int. Cl.$^4$ ............................................... C08J 3/00
[52] U.S. Cl. .................................... 523/346; 523/337; 524/475; 524/801
[58] Field of Search ................ 523/337, 346; 524/801, 524/475

[56] References Cited

U.S. PATENT DOCUMENTS

| | | | |
|---|---|---|---|
| 3,284,393 | 11/1966 | Vanderhoff et al. | 524/801 |
| 3,624,019 | 7/1974 | Anderson et al. | 524/375 |
| 3,691,124 | 9/1972 | Barron | 524/801 |
| 3,826,771 | 7/1974 | Anderson et al. | 524/606 |
| 3,996,180 | 12/1976 | Kane | 524/801 |
| 4,024,097 | 5/1977 | Slovinsky et al. | 524/801 |
| 4,363,886 | 12/1982 | Lipowski et al. | 524/801 |
| 4,391,932 | 7/1983 | Tai | 523/337 |

Primary Examiner—Paul R. Michl
Assistant Examiner—Alex H. Walker

[57] ABSTRACT

Multi-modal emulsions comprise a continuous oil phase and a discontinuous aqueous phase having two or more droplet size distributions and comprising a water-soluble polymer. Such emulsions are prepared by subjecting portions of the emulsion to varying rates of shear during emulsion formation. The multi-modal emulsions can have high polymer solids, reduced oil content, low bulk viscosity and high stability.

26 Claims, No Drawings

MULTI-MODAL EMULSIONS OF WATER-SOLUBLE POLYMERS

BACKGROUND OF THE INVENTION

This invention relates to water-in-oil emulsion polymerization processes and to the water-in-oil emulsions prepared therefrom.

Various water-soluble polymers such as polyacrylamide and copolymers of acrylamide with other anionic, cationic or nonionic monomers are well-known to be precipitants or flocculants for many substrates including sewage, cellulosic fibers and fines for retention and freeness, effluent waste for metal production, coal tailings and the like. Such polymers are also known to exhibit superior thickening properties when said polymers are dissolved in aqueous media. Particularly well-known for this purpose are the anionic polyacrylamides such as acrylamide/acrylic acid copolymers, including those prepared by hydrolysis of polyacrylamide. Such polymers are also very useful as fluid mobility control agents in enhanced oil recovery processes.

In the past, such polymers have been made available commercially as powders or finely divided solids which must be subsequently dissolved in an aqueous medium in order to be used. Because such dissolution steps are sometimes time consuming and often require rather expensive mixing equipment, it has become a common practice to formulate the water-soluble polymers in water-in-oil emulsions wherein the polymer is dissolved in the dispersed aqueous phase. Such emulsions, as well as methods for preparing them, are described in U.S. Pat. No. 3,284,393 to Vanderhoff et al. In order to accelerate the inversion (i.e., solubilization) rate of such emulsions, it has been a common practice, for example, as shown in U.S. Pat. No. Re. 28,474, to add a water-soluble surfactant to the emulsion during or just prior to inversion. While the foregoing procedures generally do overcome the problems of dissolving dry powders of water-soluble polymers in aqueous media, such emulsions contain substantial quantities of water and oil, thus increasing the cost of manufacturing, shipping and handling such polymers to a significant degree. In addition, the stability of such emulsions after storage for significant periods is often very poor.

In an attempt to employ less quantities of water and oil in said emulsion, it is taught in U.S. Pat. No. 4,052,353 to concentrate such emulsions by removing water from the emulsions and subsequently adding sufficient water-soluble surfactant to render the water-soluble polymer self-dissolving in water. Unfortunately, however, the stability of such emulsions after storage for significant periods is not as high as is desirable. Other attempts to employ less quantities of oil in said emulsions have been made by decreasing the oil phase of said emulsions while holding the polymer-water phase constant, as taught in U.S. Pat. No. 3,826,771. Unfortunately, the bulk viscosity of said emulsions increases severely, and limits such attempts to concentrate conventional emulsions.

In view of the foregoing deficiencies of conventional emulsions and concentrated dispersions derived from such emulsions, it is highly desirable to provide a water-in-oil emulsion of a water-soluble polymer that can be inverted quickly into an aqueous medium, can be stored for substantial periods of time without losing stability, contains a high polymer content, and yet exhibits a low bulk viscosity.

SUMMARY OF THE INVENTION

The present invention is a water-in-oil emulsion polymerization method for preparing polymers of water-soluble monomers which comprises:
(1) preparing a stable water-in-oil emulsion by:
 (a) providing an aqueous solution comprising water and at least one water-soluble monomer,
 (b) providing an oil solution comprising an inert hydrophobic organic liquid,
 (c) mixing a portion of the aqueous solution to the oil solution in an amount sufficient to form an aqueous dispersed phase,
 (d) subjecting the mixture to a shear rate at least sufficient to form a portion of said water-in-oil emulsion,
 (e) admixing an additional portion of the aqueous solution to the resulting portion of the emulsion previously prepared in amounts sufficient to form an aqueous dispersed phase, and
 (f) subjecting the resulting mixture to a shear rate progressively lower than that employed in forming the previous portion of the emulsion,
 (g) wherein steps (e) and (f) are performed at least once until said water-in-oil emulsion is formed, and
(2) subjecting the resulting emulsion to polymerization conditions.

In another aspect, the present invention is a water-in-oil emulsion polymerization method for preparing polymers of water-soluble monomers which comprises:
(1) preparing a stable water-in-oil emulsion by:
 (a) providing an aqueous solution comprising water and at least one water-soluble monomer,
 (b) providing an oil solution comprising an inert hydrophobic organic liquid,
 (c) mixing a portion of the aqueous solution to a portion of the oil solution in an amount sufficient to form an aqueous dispersed phase,
 (d) subjecting the mixture to a shear rate at least sufficient to form a portion of said water-in-oil emulsion,
 (e) admixing an additional portion of the aqueous solution to an additional portion of the oil solution in amounts sufficient to form an aqueous dispersed phase,
 (f) subjecting the resulting mixture to a shear rate progressively lower than that employed in forming the previous portion of the emulsion,
 (g) wherein steps (e) and (f) are performed at least once, and
 (h) mixing various portions together to yield said water-in-oil emulsion, and
(2) subjecting the resulting emulsion to polymerization conditions.

In yet another aspect, the present invention is a water-in-oil emulsion polymerization method for preparing polymers of water-soluble monomers which comprises:
(1) preparing at least one stable water-in-oil emulsion by:
 (a) providing an aqueous solution comprising water and at least one water-soluble monomer,
 (b) providing an oil solution comprising an inert hydrophobic organic liquid, (c) mixing a portion of the aqueous solution to a portion of the oil solution in an amount sufficient to form an aqueous dispersed phase, (d) subjecting the mixture to a shear rate at least sufficient to form a water-in-oil emulsion, (e) admixing an additional portion of the aqueous solution to an additional portion of the oil solution in amounts sufficient to form an aqueous dispersed phase, and (f) subjecting the resulting mixture to a shear rate progressively lower than that employed in forming the previous emulsion, (g) wherein steps (e) and (f) are performed at least once, and (2) subjecting each of the resulting water-in-oil emulsions to polymerization conditions, and (3) mixing the various water-in-oil emulsions together.

In still another aspect, the present invention is a water-in-oil emulsion of water-soluble polymer prepared by each of the aforementioned processes.

Emulsions can be prepared by incorporating at least one emulsifying surfactant into the process of this invention. Emulsions can also be prepared by incorporating at least one emulsifying surfactant and at least one inverting surfactant into the process of this invention.

The emulsions of this invention are superior to conventional emulsions in that they can have higher polymer solids than said conventional emulsions. In addition, the emulsions of this invention can have reduced oil content, lower bulk viscosity and greater stability than are characteristic in the conventionally prepared emulsions which contain comparable amounts of solids. The emulsions of this invention, although generally self-inverting upon the addition to water, are stable enough in that they can be stored for long periods of time and/or can undergo several freeze/thaw cycles without irreversible coagulation or precipitation. These emulsions have the ability to invert readily into aqueous media containing an inverting surfactant and substantial quantities, e.g., from about 0.0001 to about 20 weight percent, of dissolved salts.

In addition to their utility as additives in drilling muds, fracturing fluids and fluid mobility control agents in enhanced oil recovery methods, the polymers prepared in accordance with the practice of the present invention are also useful as flocculating agents for sewages, industrial wastes, mining streams such as coal slurries and mining effluents, as thickeners for coating formulations, as additives for the manufacture of paper, and in a variety of other uses common for such polymers prepared by other conventional polymerization methods.

DETAILED DESCRIPTION OF THE ILLUSTRATIVE EMBODIMENTS

The present invention is practiced in the preparation of water-in-oil emulsions containing any water-soluble polymer. Such emulsions are those wherein the dispersed phase is an aqueous phase having dissolved therein said water-soluble polymer, and the continuous oil phase is a water-immiscible inert organic liquid. In emulsions of this invention, the ratio of the aqueous phase to the oil phase is such that the emulsion contains from about 50 to about 95, preferably from about 70 to about 95, weight percent of aqueous phase. Advantageously, the emulsion comprises preferably from about 72 to about 90, most preferably from about 74 to about 85, weight percent dispersed (i.e., aqueous) phase based on the total weight of the emulsion. The amount of polymer contained in the emulsion can vary providing that the resulting emulsion is stable, and is advantageously from about 21 to about 80, more preferably from about 24 to about 75, most preferably from about 27 to about 70, weight percent polymer based on the total weight of the emulsion. In the emulsions, the weight ratio of water to polymer in the aqueous phase can vary and is desirably from about 0.001:1 to about 3.4:1, more preferably from about 0.01:1 to about 2.9:1, and most preferably from about 0.08:1 to about 2.6:1. The weight ratio of oil to polymer can vary and is preferably from about 0.2:1 to about 1:1, more preferably from about 0.25:1 to about 0.98:1, most preferably from about 0.3:1 to about 0.95:1.

For the purposes of this invention, the water-soluble polymer contained in the aqueous phase of the emulsion is one that forms a thermodynamically stable mixture when combined with water. These mixtures form spontaneously and include true solutions in which the individual polymer molecules are dispersed as well as micellular or colloidal solutions wherein the polymer molecules are aggregated to some extent, but wherein such aggregates are no larger than colloidal size. Accordingly, such water-soluble polymers are generally homopolymers and copolymers of water-soluble ethylenically unsaturated monomers.

Suitable water-soluble monomers include those that are at least water-miscible and that are preferably sufficiently water-soluble to form at least a 5 weight percent solution when dissolved in water and readily undergo addition polymerization to form polymers that are water-soluble. Exemplary water-soluble monomers include ethylenically unsaturated amides such as acrylamide, methacrylamide and fumaramide; their N-substituted derivatives such as 2-acrylamide-2-methylpropane sulfonic acid (AMPS), N-(dimethylaminomethyl)acrylamide as well as N-(trimethylammoniummethyl)acrylamide chloride and N-(trimethylammoniumpropyl)methacrylamide chloride; ethylenically unsaturated carboxylic acids such as acrylic acid, methacrylic acid, itaconic acid and fumaric acid; ethylenically unsaturated quaternary ammonium compounds such as vinylbenzyl trimethyl ammonium chloride, sulfoalkyl esters of unsaturated carboxylic acids such as 2-sulfoethyl methacrylate; aminoalkyl esters of unsaturated carboxylic acids such as 2-aminoethyl methacrylate and 2-(N,N-dimethylamino)ethyl methacrylate as well as the quaternized derivatives thereof such as acryloylethyl trimethyl ammonium chloride; vinyl amines such as vinyl pyridine and vinyl morpholine, diallyl amines and diallyl ammonium compounds such as diallyl dimethyl ammonium chloride; vinyl heterocyclic amides such as vinyl pyrrolidone; vinylaryl sulfonates such as vinylbenzyl sulfonate as well as the salts of the foregoing monomers. Of the foregoing water-soluble monomers, acrylamide and combinations of acrylamide and acrylic acid are preferred. Homopolymers of acrylic acid can also be prepared. Homopolymers prepared from acrylamide and copolymers prepared from combinations thereof with other water-soluble monomers are more preferred. Also preferred are polymers wherein the water-soluble monomers range from about 60 to about 99 mole percent of acrylamide and/or partially hydrolyzed acrylamide from about 1 to about 40 mole percent of other water-soluble monomers.

The molecular weight of the water-soluble polymer is not particularly critical and may vary over a wide range from about 100,000 to about 25 million depending on the desired use of the polymer. Preferred polymers have weight average molecular weight in the range from about 2 to about 10 million.

The water-immiscible oil phase of the emulsion generally comprises at least one inert hydrophobic liquid. Usually such liquid is an organic liquid such as a liquid hydrocarbon or substituted hydrocarbon. Preferred organic liquids are the halogenated hydrocarbons such as perchloroethylene, methylene chloride and the like as well as liquid hydrocarbon having from 4 to 15 carbons per molecule including aromatic and aliphatic hydrocarbons and mixtures thereof, e.g., benzene, xylene, toluene, mineral oils, liquid paraffins such as kerosene, naphtha and the like. Of the foregoing organic liquids, the hydrocarbons are the more preferred, with aliphatic hydrocarbons being most preferred.

The water-in-oil emulsions are prepared by following the general procedure described in the prior art as exemplified in U.S. Pat. Nos. 3,284,393; Re. 28,474; Re. 28,576 and 4,376,850, which are hereby incorporated by reference. In such methods, an aqueous solution of water-soluble, ethylenically unsaturated monomer(s) is dispersed in the inert hydrophobic organic liquid containing a sufficient amount of a water-in-oil emulsifying agent to form a water-in-oil emulsion of the water-soluble monomer(s).

Broadly speaking, the emulsions of this invention are referred to as multi-modal water-in-oil emulsions. Specifically, water-in-oil emulsions of this invention are prepared by obtaining varying sets of dispersed aqueous phase droplets of differing diameters (i.e., size distributions) by employing separate emulsification steps. One method for preparing such emulsions can involve the preparation of a set of small droplets by adding a desired portion of the aforementioned aqueous solution to the oil solution, which preferably contains at least one surfactant, and subjecting the mixture to high shear. To this water-in-oil emulsion is added another desired portion of aqueous solution. This mixture is then subjected to a lower shear rate than previously employed to yield an emulsion having two distinguishable droplet size distributions each of which exhibit a dispersion or cluster of droplet sizes about two mean values. Alternatively, a portion of the aqueous solution can be mixed with a portion of the oil solution, which preferably contains one or more surfactants, and subjected to high shear, while the remaining portion of the aqueous solution and the remaining oil solution are mixed and subjected to another rate of shear. The two (or more) emulsions so formed can then be mixed and agitated. The aforementioned processes can be repeated indefinitely using varying proportions of aqueous solution and varying shear rates until all of the aqueous solution is exhausted. It is necessary that the process be carried out to, at least, yield a bimodal system.

Another method of preparing the multi-modal emulsions of this invention includes mixing portions of the aqueous solution with the oil solution, which preferably contains at least one surfactant, and subjecting the mixture to high shear as described hereinbefore to yield an emulsion comprising small size droplets. This process of adding the aqueous solution to the oil solution or to the water-in-oil phase can be repeated several times using progressively lower shear rates, if desired, and the remaining portion of the aqueous solution is added to the reactor together with said emulsion, wherein the resulting mixture is agitated using the reactor agitator to yield a portion of large size droplets. For example, in one embodiment of this invention, a bimodal emulsion is prepared by adding a portion of the aqueous solution to the oil and surfactant solution and subjecting the mixture to high shear. The emulsion so prepared is then added to a reactor together with the remaining portion of the aqueous solution, and the resulting mixture is agitated using the reactor agitator or a static mixer at the lower shear rate to yield a bimodal emulsion.

Another method of preparing the multi-modal emulsions of this invention involves mixing a portion of the aqueous solution which contains the water-soluble monomer with a portion of the oil solution, which preferably contains at least one surfactant, and subjecting the mixture to high shear. The remaining portion of the aqueous solution and the remaining portion of the oil solution is mixed and subjected to another rate of shear. The two (or more) emulsions so formed can each be subjected to polymerization conditions as described hereinafter. The two (or more) polymer-containing emulsions so formed are then mixed together.

Varying shear rates are provided by devices such as static mixers, stirrers, inline dispersers, inline mixers, vessel agitators, blenders, ultrasonic homogenizers, or comparable agitating devices. As used herein, the term "shear" is to be broadly construed to include shearing and agitation provided by a wide variety of mixing and/or emulsifying devices. The size of various sets of droplets so prepared is inversely proportional to the rate of shear employed (i.e., the higher the shear rate, the smaller the droplet size). It is also understood that droplet sizes are also affected by factors such as the type of blade employed in the device providing the high shear rate, and the like.

The amount of time each emulsion is subjected to a particular shear rate or agitation is generally a significant factor in the width of the droplet size distribution. For example, an emulsion which is subjected to a high shear for a long period of time will generally have a narrow droplet size distribution (i.e., a relatively narrow dispersion of sizes clustered about a mean droplet diameter value). Thus, it is possible to prepare multimodal emulsions which exhibit separate and distinct droplet size distributions. Conversely, it is possible to prepare multi-modal emulsions which exhibit significant overlap of droplet size distribution by employing shear rates in the preparation of each portion of the water-in-oil emulsion which are not significantly different and/or by subjecting each portion of the emulsion to a short shear time.

It is understood that by employing varying devices which provide varying shear rates and varying mixing, shearing or agitation times which yield various modes of droplets, a very broad droplet size distribution can be obtained. That is, it is possible, for example, to slowly add the aqueous phase to the oil phase while slowly lowering the rate of shear to which the emulsion is subjected. The broad distribution so obtained can represent an average of the various droplet size distributions and resemble one very broad particle size distribution. It is understood that an emulsion having a broad droplet size distribution but prepared via the process of this invention is considered to fall within the scope of this invention.

The size (i.e., diameter) of the individual sets of droplets of the emulsion can vary. The size of the smallest aqueous phase droplets will vary depending upon the type of high shear device which is employed, the surfactant system employed, and to a much lesser extent, to the length of time that the particular portion of the emulsion is subjected to said shear. The size of the small droplets can be as small as possible as to be within practical limits. That is, the highest shear rates will provide the smallest size droplets.

As previously mentioned, the surfactant system which is employed can affect the size of the aqueous phase droplets. For example, varying amounts and types of surfactants can be added at various times during emulsion preparation. However, surfactant systems affect the size of the aqueous phase droplets and, hence, affect the distribution of droplets of the multi-modal emulsion, to a much lesser extent than do the varying shear rates.

The bimodal emulsion is an example of one of the multi-modal emulsions of this invention. Such a bimodal emulsion comprises small dispersed phase droplets which most desirably cluster about a droplet size which can range from about 0.01 $\mu$m to about 1 $\mu$m, preferably from about 0.1 $\mu$m to about 1 $\mu$m in diameter. The large dispersed phase droplets can cluster about a droplet size which can range from greater than about 1 $\mu$m to about 40 $\mu$m, preferably from about 1 $\mu$m to about 20 $\mu$m in diameter. By the term "cluster about a droplet size" is meant that the droplet size distribution is narrow in an identifiable droplet size range. Thus, there preferably exist two identifiable and distinct droplet size distributions. Preferably, the diameter of the large droplets is about 3 to about 100 times that of the diameter of the small droplets. It is most preferable that the ratio of the diameter of the large droplets to that of the small droplets be as large as possible within practical limits. For the bimodal emulsion, the small droplets can contain from about 2 to about 98, preferably from about 20 to about 80, most preferably from about 30 to about 75, weight percent of the total dispersed phase, while the large droplets can contain from about 2 to about 98, preferably from about 20 to about 80, most preferably from about 25 to about 70, weight percent of the total dispersed phase.

Emulsifiers suitably employed for purposes of emulsifying the aqueous phase containing the water-soluble monomer in the organic liquid are those emulsifiers that promote the formation and stabilization of water-in-oil emulsions. Normally, such emulsifiers have a hydrophilic-lipophilic balance (HLB) in the range from about 2 to about 9, most preferably from about 3 to about 6. Other suitable emulsifying agents include hexadecyl sodium phthalate, decyl sodium phthalate, octadecyl sodium phthalate, sorbitan monooleate, sorbitan stearate, glycerine mono- or distearate and combinations of such emulsifying agents. Generally, the emulsifier is used in amounts sufficient to provide the desired water-in-oil emulsion. This amount is normally in the range from about 0.1 to about 20, preferably from about 3 to about 9, weight percent based on the weight of monomer.

Polymerization of the water-in-oil emulsion of the water-soluble monomer(s) is advantageously effected under conventional conditions such as described in U.S. Pat. Nos. 3,284,393; Re. 28,474; Re. 28,576 and 4,376,850. Normally, such polymerization is practiced in the presence of a polymerization initiator capable of generating free-radicals. Preferably, this free-radical initiator is employed in amounts from about 0.01 to about 0.1 weight percent of initiator based on the monomers. Exemplary polymerization initiators include the inorganic persulfates such as potassium persulfate, ammonium persulfate and sodium persulfate; azo catalysts such as azobisisobutyronitrile and dimethylazoisobutyrate; organic peroxygen compounds such as benzyl peroxide, t-butylperoxide, diisopropylbenzene hydroperoxide, t-butyl hydroperoxide; and compounds such as sodium borohydride. Of these initiators, the organic types such as t-butyl hydroperoxide are preferred. In addition to the aforementioned ingredients, the emulsion polymerization recipe optionally includes chain transfer agents, chelating agents, buffers, salts, and the like.

An inverting surfactant is advantageously incorporated into the emulsion in an amount that is sufficient to improve the emulsion properties and stability and to a lesser extent, to lower the bulk viscosity of emulsion to a value that is at least about 5 percent lower than the bulk viscosity of the emulsion prior to addition of the surfactant, provided that said amount is less than that which destabilizes the emulsion. By "destabilizing the emulsion" is meant that the water-in-oil emulsion of water-soluble polymer separates into two phases having a single interface or inverts into an oil-in-water emulsion. The amount of inverting surfactant that is employed generally depends upon the nature of the surfactant. Preferably, said amount of inverting surfactant that is added is in the range from about 0.1 to about 200 weight percent based on the weight of the water-in-oil emulsifier used, more preferably from about 1 to about 150 weight percent. It is desirable to add some of the inverting surfactant prior to polymerization.

In one preferred embodiment of this invention, an initial portion of inverting surfactant is added to the monomeric precursor, or it is added to the aqueous phase or oil phase prior to formation of the monomeric precursor, so long as it is present in the monomeric precursor prior to the completion of polymerization. Such initial portion of inverting surfactant is usually an amount in the range from about 0.1 to about 100 weight percent based on the weight of water-in-oil emulsifier used, most preferably from about 20 to about 40 weight percent. The resulting stable multi-modal water-in-oil emulsion of monomer is then subjected to free-radical forming conditions in order to polymerize the monomer in the dispersed phase to form a water-in-oil emulsion of the water-soluble polymer. Subsequent to polymerization, this emulsion which already contains an initial portion of inverting surfactant is combined with additional inverting surfactant which may or may not be the same as the inverting surfactant added prior to polymerization. This postadded inverting surfactant is added in an amount sufficient to enhance the invertibility of the emulsion, but not enough to destabilize the emulsion. Preferably, this amount of inverting surfactant added after polymerization is in the range from about 0.1 to about 200, most preferably from about 10 to about 150, weight percent based on the weight of water-in-oil emulsifier used.

Also, in yet another embodiment, no inverting surfactant is added prior to polymerization but rather it is added afterwards. Preferably, such an amount of inverting surfactant is in the range from about 0.1 to about 200, more preferably from about 10 to about 150, weight percent based on the weight of the water-in-oil emulsifier employed to prepare the emulsion. In the least preferred, but suitable embodiment of this invention, all of the inverting surfactant is added before polymerization.

Inverting surfactants suitably employed in the practice of this invention are generally those that promote the formation of oil-in-water emulsions or dispersions when said emulsion is combined with sufficient water to form a continuous aqueous phase. Generally, such inverting surfactants are water-soluble compounds having an HLB in the range from about 6.5 to about 20, preferably from about 10 to about 18. Examples of such inverting surfactants include nonionic, anionic, cationic or amphoteric surfactants with nonionic surfactants being preferred.

Preferred nonionic surfactants include (1) alkyl polyethyleneoxy compounds such as alkyl polyethyleneoxy alcohol represented by the formula:

$$R-(EO)_n-H$$

wherein R is $C_4-C_{20}$ alkyl, EO is ethyleneoxy and n is a number from 1 to 20 and (2) nonionic surfactants such as the reaction products of ethylene oxide or mixtures of ethylene oxide and higher alkylene oxide with active hydrogen compounds such as phenols, alcohols, carboxylic acids and amines, e.g., alkylphenoxyethyleneoxy alcohols and alkylphenoxy polyethyleneoxy alcohols.

Also suitable are anionic compounds represented by the formula:

$$R-X$$

wherein R is as defined hereinbefore and X is $SO_3H$, $CO_2H$ or $PO_3H$ and salts thereof. Examples include long chain carboxylates such as potassium oleate, sodium laurate, potassium stearate, potassium caprolate, sodium palmatate and the like; alkali metal alkylbenzene sulfonates such as sodium nonylbenzene sulfonate and potassium dodecylbenzene sulfonate; alkali metal alkyl sulfates such as sodium dodecyl sulfate and alkali metal dialkyl sulfosuccinates such as sodium dihexyl sulfosuccinate and sodium dioctyl sulfosuccinate; salts of resin acids such as abietic acid and dihydroabietic acid.

Also suitable are cationic surfactants such as alkyl ammonium or quaternary ammonium salts, e.g., dodecyl ammonium hydrochloride, dodecyl trimethyl quaternary ammonium chloride and the like, and ethoxylated fatty amines. Other suitable surfactants are described in McCutcheon's *Detergents and Emulsifiers*, North American Edition, 1980 Annual. Also included in the aforementioned surfactants are oligomeric and polymerizable surfactants described at pages 319–322 of Blackley, *Emulsion Polymerization*, Halsted Press (1975). Examples of such oligomers include ammonium and alkali metal salts of functionalized oligomers sold by Uniroyal Chemical under the trade name "Polywet" and copolymers of acrylonitrile and acrylic acid having molecular weights less than 2000 which are prepared in the presence of chain terminating agents such as n-octyl mercaptan. Examples of polymerizable surfactants include sodium salts of 9- and 10-(acryloylamido)stearic acid and the like. Of the foregoing surfactants, the nonionic types are preferred, with ethoxylated alkyl phenols and ethoxylated fatty alcohols being most preferred.

It is possible to concentrate the emulsions prepared via the process of this invention. In concentrating the emulsion, said emulsion is subjected to conditions such that a significant part of water and other volatiles are removed from the emulsion. Such volatilizing conditions can involve heating and/or subjecting the emulsion to reduced pressure in order to volatilize the components to be removed. Preferably, concentration is achieved by subjecting the emulsion to temperatures from about 25° to about 120° C., most preferably from 40° to 100° C. and pressures from about 1 to about 760, most preferably from 1 to about 100, millimeters (mm) of mercury. It is understood that the volatiles to be removed may be entirely water or a mixture of water and oil. It is further understood that it is not generally necessary to maintain any particular water to oil ratio in the emulsion during or subsequent to removal of the volatiles.

The concentrated emulsion is generally self-inverting in that it inverts readily when dispersed into water without the necessary addition of additional inverting surfactant thereto. Such an emulsion is particularly effective for inversion into aqueous media containing from about 0.0001 to about 20, especially from about 0.001 to about 5, weight percent of dissolved salts such as sodium chloride, calcium chloride, magnesium chloride and the like. When inverting the concentrated emulsions of this invention into more concentrated brines, it is often desirable to add additional inverting surfactant to the concentrated emulsion or to the brine prior to inversion.

An advantage of the multi-modal emulsions of this invention includes the ability to prepare stable emulsions having higher aqueous phase concentrations than those prepared using conventional emulsification techniques and which are prepared using similar surfactant concentrations. Thus, it is possible through the process of this invention to prepare stable emulsions (i.e., emulsions which do not gel or otherwise fail) with higher solids content than those prepared using conventional emulsion techniques. Another advantage of the multi-modal emulsions is that the bulk viscosity of said multi-modal emulsions is low, as compared to a conventionally prepared emulsion. Yet another advantage of the multi-modal emulsions of this invention concerns the lack of compaction tendencies of said emulsion (i.e., the amount of polymer that coagulates and sticks together at the bottom of a storage vessel over time). The multi-modal emulsions of this invention exhibit a lower tendency to compact than do conventional emulsions.

The following examples are given to illustrate the invention and should not be construed as limiting its scope. Unless otherwise indicated, all parts and percentages are by weight.

EXAMPLE 1

An emulsion of a water-soluble polymer and having a bimodal droplet size distribution is prepared as follows.

Into a 2-liter beaker is added 660.83 g of a 49.2 percent aqueous acrylamide solution, 139.36 g of acrylic acid, 308.31 g of water, and 2.52 g of the penta-sodium salt of diethylenetriaminepentaacetic acid (40.2 percent solution). The mixture is stirred on a magnetic stirrer and slowly neutralized using 143.94 g of a 50 percent sodium hydroxide solution.

Using a Waring Blendor, an oil phase is prepared by adding 20.16 g of a 50 percent solution of the isopropanolamide of oleic acid in a liquid hydrocarbon, 10.08 g of sorbitan monooleate, 5.04 g of a polyethylene glycol ether of a secondary alcohol sold by Union Carbide under the trade name Tergitol 15-S-9, and 459.76 g of a liquid hydrocarbon. This mixture is then stirred for about 10 seconds.

To the oil phase is added 941.3 g of the aqueous phase. An emulsion is prepared by running the Waring Blendor at high speed for 1 minute. This emulsion is added to a jacketed, 2-liter glass reactor and agitated at 580–600 rpm. The remaining 313.7 g of the aqueous phase is added to the emulsion with stirring. The emulsion is purged with nitrogen and agitated for 42 minutes. The agitator speed is reduced to about 60 rpm.

A free radical initiator (0.25 ml of 70 percent t-butyl hydroperoxide and 0.1 percent sulfur dioxide in nitrogen) is added. The emulsion is polymerized as described in U.S. Pat. No. 3,284,393 to form a water-in-oil emulsion of an acrylamide/acrylic acid copolymer. The contents of the reactor are drained and filtered and the product has a bimodal size distribution. The product is designated Sample No. 1.

A conventional water-in-oil emulsion of an acrylamide/acrylic acid copolymer is prepared as described in U.S. Pat. No. 3,284,393 and is designated Sample No. C-1. The properties of the emulsion so prepared are compared to those of the bimodal emulsion, Sample No. 1. The results are shown in Table I.

TABLE I

| Sample | Percent Solids[1] | Bulk Viscosity[2] | Percent Clears[3] | Percent Compacted[4] |
|---|---|---|---|---|
| 1 | 35.5 | 360 | 0.49 | 4.7 |
| C-1* | 34.2 | 560 | 1.0 | 9.8 |

*Not an example of the invention.
[1]Percent Solids is percent of polymer solids in the emulsion.
[2]In centipoises as measured using a Brookfield RVT, #3 spindle, 10 rpm at 21° C.
[3]Percent clears is the volume percent of clear layer near the surface of a centrifuge tube after 2 hours centrifugation at 2600 rpm using a Damon IEC Model NH-SII Centrifuge.
[4]Percent compacted is the volume percent of nondispersible polymer which coagulates near the bottom of a centrifuge tube after 2 hours of centrifugation at 2600 rpm as determined by inverting the graduated centrifuge tube and measuring the amount of polymer sticking near the bottom of said tube.

The results in Table I indicate that the bimodal emulsion (Sample No. 1) exhibits a lower bulk viscosity, lower percent clears, lower compaction and higher solids content as compared to the emulsion prepared using conventional techniques (Sample No. C-1).

EXAMPLE 2

An emulsion of a water-soluble polymer and having a bimodal droplet size distribution is prepared as follows.

Into a 2-liter beaker is added 703.86 g of a 49.4 percent aqueous acrylamide solution, 149.03 g of acrylic acid, 332.60 g of water, and 2.68 g of the pentasodium salt of diethylenetriaminepentaacetic acid (40.2 percent solution). The mixture is stirred on a magnetic stirrer and slowly neutralized using 153.94 g of a 50 percent sodium hydroxide solution.

Using a Waring Blendor, an oil phase is prepared by adding 17.70 g of a 60.9 percent solution of the isopropanolamide of oleic acid in a liquid hydrocarbon, 10.78 g of sorbitan monooleate, 5.39 g of a polyethylene glycol ether of a secondary alcohol sold by Union Carbide under the trade name Tergitol 15-S-9, and 384.02 g of a liquid hydrocarbon. This mixture is then stirred for about 10 seconds.

To the oil phase is added 1010.6 g of the aqueous phase. An emulsion is prepared by running the Waring Blendor at high speed for 1 minute. This emulsion is added to a jacketed, 2-liter glass reactor and agitated at 400-410 rpm. The remaining 331.5 g of the aqueous phase is added to the emulsion with stirring. The emulsion is purged with nitrogen and agitated for 42 minutes. The agitator speed is reduced to about 65 rpm.

A free radical initiator (0.25 ml of 70 percent t-butyl hydroperoxide and 0.1 percent sulfur dioxide in nitrogen) is added. The emulsion is polymerized as described in U.S. Pat. No. 3,284,393 to form a water-in-oil emulsion of an acrylamide/acrylic acid copolymer. The contents of the reactor are drained and filtered and the product has a bimodal size distribution and less than 0.1 percent gel.

EXAMPLE 3

An emulsion of a water-soluble polymer and having a bimodal droplet size distribution is prepared as follows.

Into a 2-liter beaker is added 241.39 g of a 48.9 percent aqueous acrylamide solution, 37.27 g of a 75 percent aqueous methacryloyloxyethyltrimethyl ammonium chloride, 14.60 g of ammonium chloride, 68.82 g of water and 2.92 g of the penta-sodium salt of diethylenetriaminepentaacetic acid (4 percent solution). The mixture is stirred on a magnetic stirrer and slowly neutralized to a pH of 6.0 with a 50 percent sodium hydroxide solution.

The oil phase is prepared as described in Example 1 by mixing 3.65 g of the isopropanolamide of oleic acid, 3.65 g of sorbitan monooleate, 2.19 g of a polyethylene glycol ether of a secondary alcohol and 125.51 g of a liquid hydrocarbon.

To the oil phase is added 50 percent of the aqueous phase and homogenized using a Waring Blendor at high speed for 30 seconds. The resulting emulsion is placed into a 500-ml resin pot equipped with a motor stirrer and drip pipes. The remaining aqueous portion is added to the emulsion, with stirring, at 300–500 rpm. The emulsion is purged with nitrogen and agitated for 45 minutes at 25° C.

To the emulsion is added t-butyl hydroperoxide and 0.1 percent of sulfur dioxide in nitrogen. The exotherm is allowed to reach 50°–55° C. in about 1.5 hours. The contents are then heated to 55° C. and sparged with 0.1 percent of sulfur dioxide in nitrogen for about 1 hour. The product has a bimodal size distribution.

EXAMPLE 4

A stable emulsion of a water-soluble polymer and having a bimodal droplet size distribution is prepared using techniques described in Example 3 and using materials in amounts as follows.

The aqueous phase comprises 309.50 g of a 48.9 percent aqueous acrylamide solution, 47.81 g of a 75 percent aqueous methacryloyloxyethyltrimethyl ammonium chloride, 18.72 g of ammonium chloride, and 3.74 g of the pentasodium salt of diethylenetriaminepentaacetic acid (4 percent solution).

The oil phase comprises 4.68 g of the isopropanolamide of oleic acid, 4.68 g of sorbitan monooleate, 2.81 g of a polyethylene glycol ether of a secondary alcohol and 110 g of a liquid hydrocarbon.

For comparison purposes, an emulsion of a water-soluble polymer is prepared using similar amounts of materials as are described above except that conventional emulsification techniques are employed. The conventionally prepared emulsion gelled and failed.

That the bimodal emulsion is stable illustrates the superiority of the process of this invention over conventional emulsification techniques which are used in preparing emulsions with reduced oil content and high solids content.

What is claimed is:

1. A water-in-oil emulsion polymerization method for preparing polymers of water-soluble monomers which comprises:
(1) preparing a stable water-in-oil emulsion by:
   (a) providing an aqueous solution comprising water and at least one water-soluble monomer,
   (b) providing an oil solution comprising an inert hydrophobic organic liquid,
   (c) mixing a portion of the aqueous solution to the oil solution in an amount sufficient to form an aqueous dispersed phase,
   (d) subjecting the mixture to a shear rate at least sufficient to form a portion of said water-in-oil emulsion,
   (e) admixing an additional portion of the aqueous solution to the resulting portion of the emulsion previously prepared in amounts sufficient to form an aqueous dispersed phase, and
   (f) subjecting the resulting mixture to a shear rate progressively lower than that employed in forming the previous portion of the emulsion,
   (g) wherein steps (e) and (f) are performed at least once until said water-in-oil emulsion is formed, and
(2) subjecting the resulting emulsion to polymerization conditions.

2. A process of claim 1 wherein at least one emulsifying surfactant is incorporated therein.

3. A process of claim 1 wherein at least one emulsifying surfactant and at least one inverting surfactant is incorporated therein.

4. A process of claim 1 wherein steps (e) and (f) are performed once.

5. A process of claim 4 wherein step (f) is performed using a reactor agitator or a static mixer.

6. A process of claim 1 wherein said emulsion is concentrated.

7. A process of claim 1 wherein said polymer is a homopolymer of acrylamide.

8. A process of claim 1 wherein said polymer is a copolymer of acrylamide and acrylic acid.

9. A process of claim 1 wherein said polymer is a copolymer of acrylamide and another water-soluble monomer.

10. A water-in-oil emulsion polymerization method for preparing polymers of water-soluble monomers which comprises:
(1) preparing a stable water-in-oil emulsion by:
   (a) providing an aqueous solution comprising water and at least one water-soluble monomer,
   (b) providing an oil solution comprising an inert hydrophobic organic liquid,
   (c) mixing a portion of the aqueous solution to a portion of the oil solution in an amount sufficient to form an aqueous dispersed phase,
   (d) subjecting the mixture to a shear rate at least sufficient to form a portion of said water-in-oil emulsion,
   (e) admixing an additional portion of the aqueous solution to an additional portion of the oil solution in amounts sufficient to form an aqueous dispersed phase,
   (f) subjecting the resulting mixture to a shear rate progressively lower than that employed in forming the previous portion of the emulsion,
   (g) wherein steps (e) and (f) are performed at least once, and
   (h) mixing various portions together to yield said water-in-oil emulsion, and
(2) subjecting the resulting emulsion to polymerization conditions.

11. A process of claim 10 wherein at least one emulsifying surfactant is incorporated therein.

12. A process of claim 10 wherein at least one emulsifying surfactant and at least one inverting surfactant is incorporated therein.

13. A process of claim 10 wherein steps (e) and (f) are performed once.

14. A process of claim 13 wherein step (f) is performed using a reactor agitator or a static mixer.

15. A process of claim 10 wherein said emulsion is concentrated.

16. A process of claim 10 wherein said polymer is a homopolymer of acrylamide.

17. A process of claim 12 wherein said polymer is a copolymer of acrylamide and acrylic acid.

18. A process of claim 10 wherein said polymer is a copolymer of acrylamide and another water-soluble monomer.

19. A water-in-oil emulsion polymerization method for preparing polymers of water-soluble monomers which comprises:
(1) preparing at least one stable water-in-oil emulsion by:
   (a) providing an aqueous solution comprising water and at least one water-soluble monomer,
   (b) providing an oil solution comprising an inert hydrophobic organic liquid,
   (c) mixing a portion of the aqueous solution to a portion of the oil solution in an amount sufficient to form an aqueous dispersed phase,
   (d) subjecting the mixture to a shear rate at least sufficient to form a water-in-oil emulsion,
   (e) admixing an additional portion of the aqueous solution to an additional portion of the oil solution in amounts sufficient to form an aqueous dispersed phase, and
   (f) subjecting the resulting mixture to a shear rate progressively lower than that employed in forming the previous emulsion,
   (g) wherein steps (e) and (f) are performed at least once, and
(2) subjecting each of the resulting water-in-oil emulsions to polymerization conditions, and
(3) mixing the various water-in-oil emulsions together.

20. A process of claim 19 wherein at least one emulsifying surfactant is incorporated therein.

21. A process of claim 19 wherein at least one emulsifying surfactant and at least one inverting surfactant is incorporated therein.

22. A process of claim 19 wherein steps (e) and (f) are performed once.

23. A process of claim 19 wherein said emulsion is concentrated.

24. A process of claim 1 wherein steps (e) and (f) are performed once and the diameter of the aqueous phase droplets prepared in step (f) are about 3 to about 100 times the diameter of the aqueous phase droplets prepared in step (d).

25. A process of claim 10 wherein steps (e) and (f) are performed once and the diameter of the aqueous phase droplets prepared in step (f) are about 3 to about 100 times the diameter of the aqueous phase droplets prepared in step (d).

26. A process of claim 19 wherein steps (e) and (f) are performed once and the diameter of the aqueous phase droplets prepared in step (f) are about 3 to about 100 times the diameter of the aqueous phase droplets prepared in step (d).

* * * * *